US012230493B2

(12) United States Patent
Inoue et al.

(10) Patent No.: US 12,230,493 B2
(45) Date of Patent: Feb. 18, 2025

(54) MICROWAVE-EXCITED LIGHT SOURCE DEVICE

(71) Applicant: Mitsubishi Electric Corporation, Tokyo (JP)

(72) Inventors: Akira Inoue, Tokyo (JP); Seiro Yuge, Tokyo (JP); Koji Ota, Tokyo (JP); Akane Nomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 18/698,711

(22) PCT Filed: Nov. 8, 2021

(86) PCT No.: PCT/JP2021/040923
§ 371 (c)(1),
(2) Date: Apr. 4, 2024

(87) PCT Pub. No.: WO2023/079725
PCT Pub. Date: May 11, 2023

(65) Prior Publication Data
US 2024/0412968 A1 Dec. 12, 2024

(51) Int. Cl.
*H01J 65/04* (2006.01)

(52) U.S. Cl.
CPC .................................. *H01J 65/044* (2013.01)

(58) Field of Classification Search
CPC ................................ H01J 65/044; H01J 65/46
See application file for complete search history.

(56) References Cited

U.S. PATENT DOCUMENTS 12,094,703 B1 * 9/2024 Huang .................. H01J 65/044
2012/0319578 A1 12/2012 Hatase et al.

FOREIGN PATENT DOCUMENTS

JP H01-134804 A 5/1989
JP H02-204902 A 8/1990
JP 2004-095378 A 3/2004
JP 2007-220410 A 8/2007
JP 2009-004234 A 1/2009
JP 2016-225037 A 12/2016
JP 2018-045986 A 3/2018
JP 2018-190665 A 11/2018
WO 2011/114937 A1 9/2011

OTHER PUBLICATIONS

International Search Report issued in PCT/JP2021/040923; mailed Jan. 25, 2022.

* cited by examiner

*Primary Examiner* — Anne M Hines
(74) *Attorney, Agent, or Firm* — Studebaker & Brackett PC

(57) ABSTRACT

A microwave-excited light source device according to the present application comprises: a center electrode that extends in an axial direction; an annular electrode that is disposed concentrically with respect to the center electrode; an arc tube that is disposed in an annular space formed between the center electrode and the annular electrode and extends along the axial direction in an elongated shape: a connection end plate to which the other pole of a microwave generation source is electrically connected; a connector that electrically connects the annular electrode and the connection end plate; and a buffer that is elastically deformed when the arc tube is subjected to an external force, thereby suppressing stress to be applied to a contact surface between the annular electrode and the connector.

4 Claims, 5 Drawing Sheets

MICROWAVE-EXCITED LIGHT SOURCE DEVICE

TECHNICAL FIELD

The present application relates to a microwave-excited light source device.

BACKGROUND ART

A microwave-excited light source device has been developed in which a light-emitting cell (arc tube) filled with a luminescent material in an annular space between a center electrode and an annular electrode is disposed, and an electromagnetic field of microwave is formed in the annular space, thereby emitting light with a desired wavelength. In this case, there has been proposed a light source device in which one end side of a mounting member in an axial direction is fixed to an annular electrode brought into close contact with an outer circumferential surface of the arc tube, and the mounting member having a thread on the other end side is used, thereby simultaneously performing electrical connection and mechanical fixation to the microwave generation source (for example, refer to Patent Document 1).

PRIOR ART DOCUMENT

Patent Document

Patent Document 1: Japanese Patent Application Laid-Open No. 2007-220410 (Paragraphs 0035 to 0036, FIG. 2, FIG. 3)

SUMMARY OF INVENTION

Problems to be Solved by Invention

As described above, with the configuration in which the electrical connection and the mechanical fixation can be simultaneously performed, the manufacturing process can be simplified. However, for example, in a case where the device is used for ultraviolet irradiation for sterilization, although light can be emitted, the light emission characteristics change owing to a change in impedance caused by a change in the electrical connection state, and there is a concern that a problem may occur in which desired irradiation cannot be performed.

The present application discloses a technique for solving the above-described problem, and an object of the present application is to provide a microwave-excited light source device capable of performing desired irradiation by appropriately maintaining an electrical connection state and suppressing a change in light emission characteristics.

Means for Solving Problems

A microwave-excited light source device disclosed in the present application in the microwave-excited light source device that is electrically connected to a microwave generation source and generates microwave-excited light includes a center electrode electrically connected to one pole of the microwave generation source and extending in an axial direction, an annular electrode concentrically disposed with respect to the center electrode, an arc tube that is disposed in an annular space formed between the center electrode and the annular electrode and emits the microwave-excited light, a connection end plate to which the other pole of the microwave generation source is electrically connected, a connector that electrically connects the annular electrode and the connection end plate, and a buffer mechanism that is elastically deformed when the arc tube is subjected to an external force and suppresses stress to be applied to a contact surface between the annular electrode and the connector.

Advantageous Effect of Invention

According to a microwave-excited light source device disclosed in the present application, it is possible to obtain a microwave-excited light source device capable of appropriately maintaining an electrical connection state even when a mechanical shock is received, suppressing a change in light emission characteristics, and performing desired irradiation.

MODE FOR CARRYING OUT INVENTION

Embodiment 1

Figure 1:
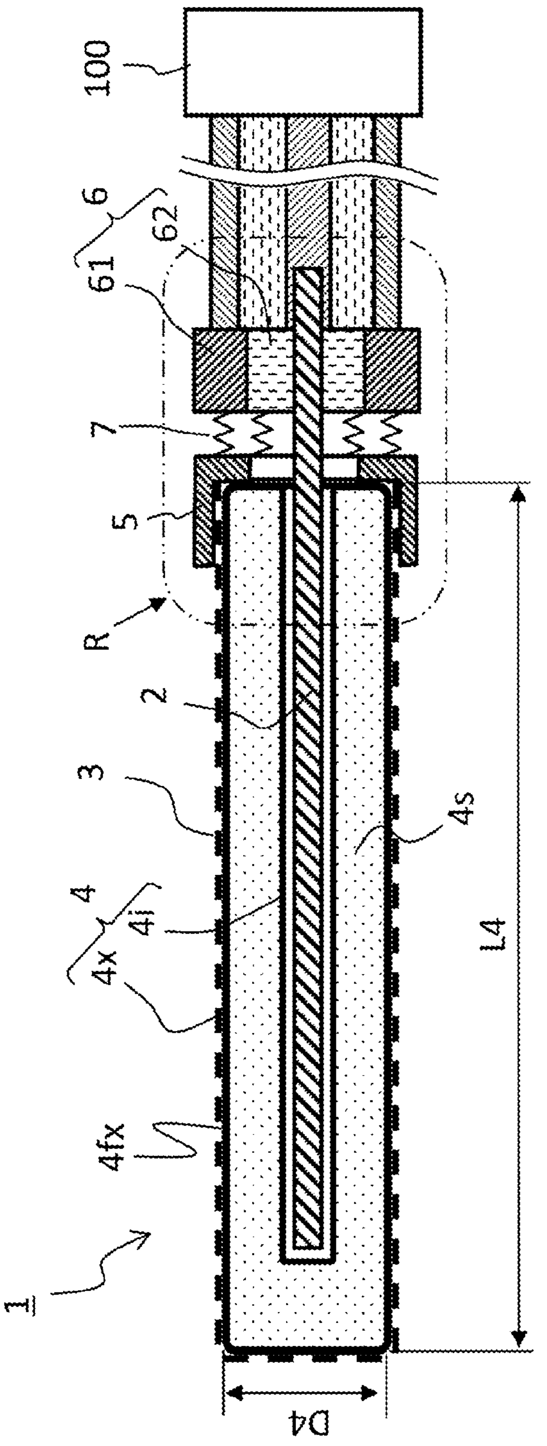
FIG. 1 is a cross-sectional view along an axis of a microwave-excited light source device according to Embodiment 1.
Figure 2:
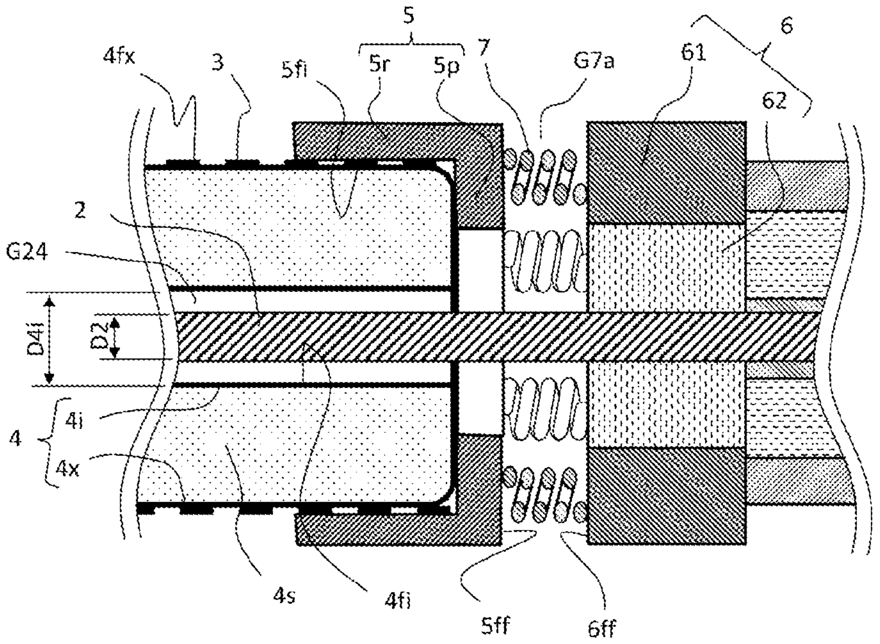
FIG. 2 is a partially enlarged cross-sectional view of a part of the microwave-excited light source device according to Embodiment 1.

FIG. 1 and FIG. 2 are diagrams for describing a configuration of a microwave-excited light source device according to Embodiment 1, FIG. 1 is a cross-sectional view taken along an axis of the microwave-excited light source device, and FIG. 2 is a partially enlarged cross-sectional view obtained by enlarging a region R in FIG. 1.

As shown in FIG. 1, a microwave-excited light source device 1 according to Embodiment 1 includes a center electrode 2 disposed at the center in the radial direction, an annular electrode 3 disposed concentrically with the center electrode 2, and an arc tube 4 arranged in an annular space between the center electrode 2 and the annular electrode 3. In addition, a connection end plate 6 that is disc-shaped and serves as a connection end for electrical connection to a microwave generation source 100, and a connector 5 in annular shape that is for electrical connection between the connection end plate 6 and the annular electrode 3 and is for mechanical fixation of the arc tube 4 to the connection end plate 6 are provided.

The arc tube 4 is, for example, a double tube formed by joining an inner tube 4*i* and an outer tube 4*x* made of quartz glass having a higher ultraviolet transmissivity than other glasses, and mercury (Hg) or the like, which is a luminescent material is sealed in the inside (light-emitting space 4*s*). The double tube has an outer diameter D4=15 mm and an axial length L4=150 mm, and has an elongated shape in which the axial length L4 is 10 times the outer diameter D4.

In addition, for example, the annular electrode 3, which is in net-shaped, referred to as a mesh conductor, and can transmit light, are in close contact with an outer circumferential surface 4*fx* of the outer tube 4*x*. At the center in the radial direction (inner side of the inner tube 4*i*), the center electrode 2 concentric with the annular electrode 3 is inserted. The central electrode 2 and the annular electrode 3 function to form an electromagnetic field in the annular space when a microwave is input from the microwave generation source 100. Then, the device is configured such that the luminescent material in the light-emitting space 4*s* is excited to emit light by the formed electromagnetic field, and thus the light is emitted through the annular electrode 3.

The connection end plate 6 includes a conductor portion 61 that is disposed on the outer peripheral side and is for electrical connection to the annular electrode 3, and an insulator portion 62 that is disposed on the inner peripheral side of the conductor portion 61 and has a through hole, which is not denoted by a reference numeral, through which the center electrode 2 passes in the center portion. The connector 5 is formed in an annular shape with a conductive material, and is fitted to the arc tube 4 so that the annular electrode 3 is interposed between the inner circumferential surface of the connector 5 and the outer circumferential surface 4*fx* of the arc tube 4 to be electrically connected to the annular electrode 3.

A coupling member 7 that mechanically couples the connector 5 and the connection end plate 6, electrically connects the connector 5 and the conductor portion 61, and functions as a buffer mechanism is further provided.

As the coupling member 7, a case is drawn in which eight helical springs as elastic bodies are arranged to disperse them at eight positions in the circumferential direction with their directions of the axes parallel to the axial direction. As shown in FIG. 2, when no mechanical shock is applied, the coupling member 7 mechanically supports the connector 5 with respect to the connection end plate 6 such that an opposing surface 6*ff* of the connection end plate 6 and an opposing surface 5*ff* of the connector 5 face each other in parallel with a clearance G7*a* in the axial direction. In addition, since the coupling member 7 is formed of a conductor, the conductor portion 61 and the connector 5 are electrically connected to each other.

Further, the connector 5 is formed of a conductive material and has an annular portion 5*r* whose inner diameter is equal to the outer diameter D4 of the arc tube 4 (strictly speaking, the diameter added with the thickness of the annular electrode 3) and an edge portion 5*p* extending radially inward at one end (right end in the figure) of the annular portion 5*r* in the axial direction. The connector 5 restrains and mechanically fixes the outer circumferential surface 4*fx* of the arc tube 4 by fitting the annular portion 5*r* into the outer circumferential surface 4*fx* of the arc tube 4 from above the annular electrode 3. Thus, an electrical connection path from one pole of the microwave generation source 100 to the annular electrode 3 via the connection end plate 6 and the connector 5 is completed.

As for the fitting, so-called shrink fitting may be used, in which the inner diameter of the annular portion 5*r* of the connector 5 is made smaller than the sum of the outer diameter D4 of the arc tube 4 and the thickness of the annular electrode 3, and the connector is fitted in a heated and expanded state. Alternatively, an inner circumferential surface 5*fi* may be formed in a tapered shape, and the annular portion 5*r* may be pushed into the arc tube 4 in the axial direction to generate a pressing force in the radial direction.

At this time, when the annular portion 5*r* is fitted until the edge portion 5*p* abuts against one end (the end portion on the right side in the figure) of the arc tube 4, the movement of the arc tube 4 in the axial direction is also restrained, and the mechanical fixation between the connector 5 and the arc tube 4 is further strengthened. On the other hand, since the arc tube 4 and the connector 5 are supported by the connection end plate 6 via the coupling member 7, which is an elastic body, the arc tube 4 and the connector 5 are allowed to move in the axial direction or in a direction inclined with respect to the axis.

The center electrode 2 is mechanically fixed to and supported by the insulator portion 62 of the connection end plate 6, but is electrically connected to the other pole of the microwave generation source 100 directly or via a coaxial cable or the like. At this time, an outer diameter D2 of the center electrode 2 is set to be smaller than an inner diameter D4*i* of the inner tube 4*i* such that there should be a clearance G24 between the outer diameter and an inner circumferential surface 4*fi* of the inner tube 4*i* of the arc tube 4, and the center electrode 2 is in a floating state with respect to the inner circumferential surface 4*fi*. That is, mechanical connection of the center electrode 2 is cut with respect to the arc tube 4, and the movement of the center electrode 2 is allowed in the axial direction of the arc tube 4 or in a direction inclined with respect to the axis. The clearance G24 is set in a range from 1 mm to 5 mm, for example, on the basis of an assumed mechanical shock (external force) and the movement of the center electrode 2 (the spring coefficient of the elastic member constituting the coupling member 7, etc.) allowed in response to the mechanical shock.

When a microwave is input from the microwave generation source 100 to the microwave-excited light source device 1 configured as described above, an electromagnetic field is formed by the microwave input in the annular space between the center electrode 2 and the annular electrode 3. By the electromagnetic field formed by the microwave, the luminescent material in the light-emitting space 4*s* of the arc tube 4, which is disposed in the annular space, is excited to emit light, and the emitted light can be output through the annular electrode 3. For example, when the electromagnetic field is generated in the annular space by a microwave of 2.45 GHz, ultraviolet rays are emitted by an excited light emission of the mercury as the luminescent material, and highly efficient sterilization can be achieved.

Here, for example, a case where a mechanical shock is applied to the arc tube 4 will be examined. In the configuration disclosed in Patent Document 1, since the elongated arc tube is fixedly supported with respect to the microwave generation source 100 or the transmission path by using a screw, a force is applied to the screw portion, which may cause irreversible deformation. Then, the contact state at the screw portion also serving as the electrical connection also changes, the impedance in the transmission path of the microwave changes from an initially set value, and the desired light emission characteristics cannot be obtained. On the other hand, this phenomenon has been overlooked so far because even in that state, the conduction is maintained and it is not in a state where the light does not emit, but the inventor of the present application found that this phenomenon should not be overlooked as a microwave-excited light source device 1.

Therefore, the microwave-excited light source device 1 of the present application is configured to form a buffer mechanism that suppresses the stress to be applied to the contact surface between the arc tube 4 and the connector 5 by, for example, elastic deformation of the coupling member 7 when the arc tube 4 is subjected to an external force. In Embodiment 1, the arc tube 4 is supported by interposing the coupling member 7 between the connector 5 into which the arc tube 4 is fitted and the connection end plate 6 serving as a support mechanism, the coupling member 7 being formed of a plurality of elastic bodies dispersed in the circumferential direction and functioning as a buffer mechanism.

Here, it is assumed that a force is applied to the arc tube 4 in a direction in which the axis thereof is to be inclined. Then, while the force is applied, the shape of the area with the clearance G7*a* is changed by the deformation of the coupling member 7, and the arc tube 4 is displaced with respect to the connection end plate 6 without being accompanied by displacement with respect to the connector 5, so that the stress applied to the interface between the arc tube and the connector 5 is relieved. As a result, displacement does not occur between the annular electrode 3 in close contact with the outer circumferential surface 4*fx* and the connectors 5, and even if an external force such as a mechanical shock is applied, the electrical connection state, that is, the impedance, can be maintained at the initially set value, and desired light emission characteristics can be maintained.

On the other hand, although the center electrode 2 is mechanically fixed to the connection end plate 6, the center electrode 2 does not hit against the inner circumferential surface 4*fi* of the arc tube 4 when the center electrode 2 is displaced, because there is the clearance G24 between the center electrode 2 and the inner circumferential surface 4*fi*, which is set in consideration of the displacement. Further, since the displacement is caused by the deformation of the elastic member 7, that is, the displacement caused by the elastic deformation, when the external force is removed, the elastic member 7 returns to the original position, that is, the regular position along the axis in the center. That is, in the deformation of the elastic body, the displacement when the external force is applied is reversible, and when the external force is removed, the annular space between the center electrode 2 and the annular electrode 3 also returns to its original state. Therefore, the state of the electromagnetic field is also recovered, and the characteristics can be maintained.

As for the arrangement of the elastic bodies constituting the coupling member 7, the number of elastic bodies to be arranged and the arrangement positions of the elastic bodies can be changed as appropriate as long as the elastic bodies are arranged at positions interposing or surrounding the axis. Further, the helical spring is not a limitation, and other forms such as a plate spring and a volute spring may be used as long as they have conductivity. Further, in the present application including the following embodiments, the arc tube 4 of a double-tube type in which the shape of the outer circumferential surface 4*fx* perpendicular to the axial direction is circular and the annular electrode 3 can be supported by the entire circumference will be described as an example, but this is not a limitation. For example, like a spiral tube, a tube in any form can be applied as long as it maintains the outer diameter to support the annular electrode 3, and the clearance G24 with the center electrode 2, even when pressed from the outer circumferential surface side.

Embodiment 2

Figure 3:
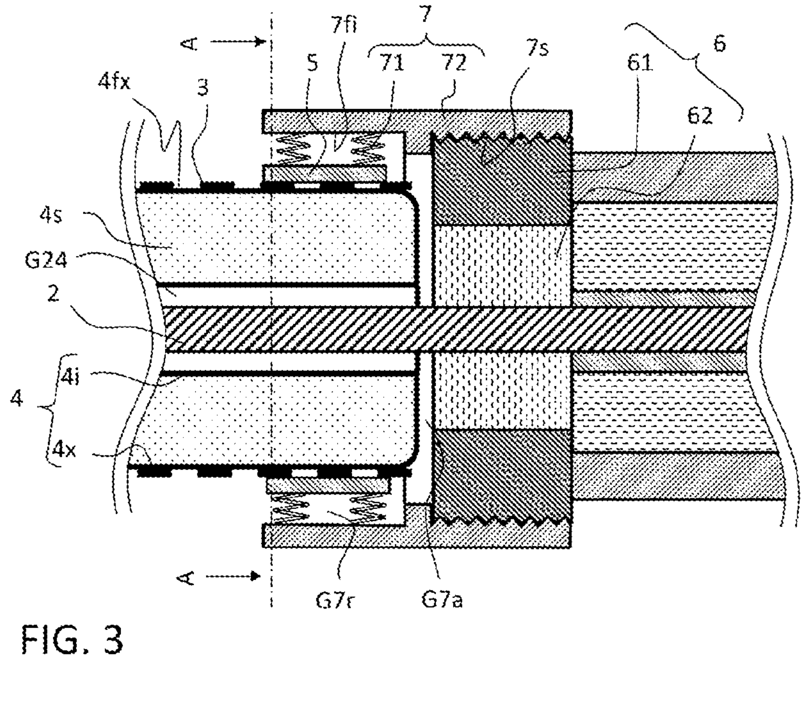
FIG. 3 is a partially enlarged cross-sectional view along an axis of the microwave-excited light source device according to Embodiment 2.
Figure 4:
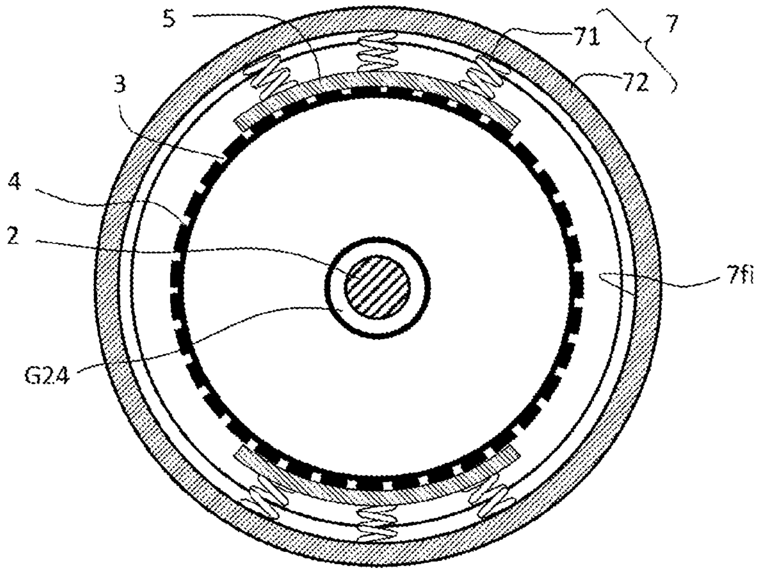
FIG. 4 is a cross-sectional view perpendicular to the axis of the microwave-excited light source device according to Embodiment 2.

In Embodiment 1 described above, an example has been described in which the clearance in the axial direction is provided between the connector and the connection end plate, and the connector and the connection end plate are coupled by an elastically deformable coupling member. In Embodiment 2, an example in which a coupling member that presses and supports a connector in the radial direction is provided will be described. FIG. 3 and FIG. 4 are for describing a configuration of a microwave-excited light source device according to Embodiment 2, FIG. 3 is a partially enlarged cross-sectional view along the axis of the microwave-excited light source device corresponding to FIG. 2 of Embodiment 1, and FIG. 4 is a cross-sectional view perpendicular to the axis, corresponding to a line A-A of FIG. 3. Note that, for each of the entire images in the arc tube, the annular electrode, and the center electrode, FIG. 1 in Embodiment 1 is referred to.

As shown in FIG. 3 and FIG. 4, the microwave-excited light source device 1 according to Embodiment 2 is provided with a coupling member 7 that couples a connector 5 and a connection end plate 6 so that the connector 5 presses the outer circumferential surface 4*fx* from above the annular electrode 3 in the radial direction. The connector 5 has an arc shape, which is obtained by dividing an annular ring along the outer circumferential surface 4*fx* of the arc tube 4 in the circumferential direction, and is provided at two positions in the circumferential direction.

Basically, as in Embodiment 1, the connection end plate 6 includes the conductor portion 61 for electrical connection to the annular electrode 3, and the insulator portion 62 disposed on the inner circumferential side of the conductor portion 61 and having a through hole formed in the center thereof for allowing the center electrode 2 to pass therethrough. In Embodiment 2, a male thread to be screwed into a female thread 7*s* formed on an inner circumferential surface of a cylindrical portion 72 of the coupling member 7 to be described later is cut on an outer circumferential surface of the conductor portion 61.

The coupling member 7 includes the cylindrical portion 72 having a cylindrical shape and provided with the female thread 7*s* on one end side in the axial direction for screwing the connection end plate 6 and an elastic member 71 extending from an inner circumferential surface 7*fi* on the other end side of the cylindrical portion 72 toward the center in the radial direction. The connection end plate 6 is mechanically fixed to the cylindrical portion 72 by screwing the connection end plate 6 into the female thread 7*s* until the connection end plate 6 abuts against a ridge portion (not denoted by a reference numeral) protruding toward the axial center at an intermediate portion in the axial direction.

On the other hand, a plurality of helical springs as the elastic member 71 whose axes are oriented in the radial direction are distributed and arranged at different positions in the axial direction and the circumferential direction so as to press the outer circumferential surface 4*fx* of the arc tube 4 covered with the annular electrode 3 via the connectors 5 from positions distributed in the circumferential direction on the inner circumferential surface 7*fi* of the cylindrical portion 72. Although a clearance G7*r* in the radial direction is provided between the cylindrical portion 72 and the arc tube 4 and a clearance G7*a* in the axial direction is provided between the arc tube 4 and the connection end plate 6, the arc tube 4 is mechanically supported by the pressing force of the elastic member 71 such that the cylindrical portion 72 and the arc tube 4 are kept concentric.

At this time, since both the cylindrical portion 72 and the elastic member 71 are formed of a conductive material, a stable electrical connection path from the connection end plate 6 (the conductor portion 61 thereof) to the elastic member 71 is completed in accordance with the mechanical fixation of the coupling member 7 and the connection end plate 6 by screwing the connection end plate 6 into the female thread 7*s*. The elastic member 71 causes the annular electrode 3 to be sandwiched between the connectors 5 and the outer circumferential surface 4*fx* of the arc tube 4, and brings the connectors 5 into close contact with the annular electrode 3 by the urging force, so that the electrical connection path from the connection end plate 6 to the annular electrode 3 is completed.

As in Embodiment 1, the center electrode 2 is mechanically fixed to and supported by the insulator portion 62 of the connection end plate 6, and is electrically connected to the other pole of the microwave generation source 100 directly or via a coaxial cable or the like. With respect to the relationship with the inner circumferential surface 4*fi* of the inner tube 4*i* of the arc tube 4, mechanical connection of the center electrode 2 is cut with respect to the arc tube 4, and the center electrode 2 is allowed to move in the axial direction of the arc tube 4 or in a direction inclined with respect to the axis.

On the premise of the configuration described above, it is assumed that a force is applied to the arc tube 4 in a direction in which the axis is to be inclined. Then, while the force is applied, the elastic member 71 of the coupling member 7 is deformed to change the shapes in the areas of the clearance G7*r* and the clearance G7*a*, and the arc tube 4 is displaced with respect to the connection end plate 6 without displacement with respect to the connectors 5, so that the stress applied to the interfaces between the arc tube 4 and the connectors 5 is relaxed. As a result, no displacement occurs between the annular electrode 3 in close contact with the outer circumferential surface 4*fx* and the connectors 5, so that the electrical connection state, i.e., the impedance, can be maintained at the initially set value and desired light emission characteristics can be maintained.

On the other hand, although the center electrode 2 is mechanically fixed to the connection end plate 6, the center electrode 2 does not hit against the inner circumferential surface 4*fi* of the arc tube 4 when the center electrode 2 is displaced, because there is the clearance G24 between the center electrode 2 and the inner circumferential surface 4*fi*. Further, since the displacement is caused by the deformation of the elastic member 71, that is, the displacement caused by the elastic deformation, when the external force is removed, the elastic member 71 returns to the original position, that is, the regular position along the axis in the center. In other words, the displacement due to the mechanical shock is reversible, and when the external force is removed, the annular space between the center electrode 2 and the annular electrode 3 also returns to its original state, so that the state of the electromagnetic field is recovered and the characteristics can be maintained.

The length and the number of the connectors 5 in the circumferential direction and the axial direction, and the type, the arrangement position, and the number of the elastic members 71 that urge each of the connectors 5 are not limited to the embodiment exemplified above. For example, FIG. 3 and FIG. 4 show an example in which two connectors 5 each having a length of about ¼ of the circumferential length in the circumferential direction are arranged so as to face each other, but this is not a limitation, and the circumferential length and the number of connectors 5 may be changed (two or more). In addition, in a case where the elastic members 71 are arranged to be distributed in the circumferential direction, a material that deforms along the outer circumferential surface 4*fx* may be used for the connector, and for example, the connector 5 may be formed of an arc-shaped plate spring.

FIG. 3 and FIG. 4 show an example in which the elastic members 71 are separately arranged at two positions in the axial direction and at three positions in the circumferential direction in each of the connectors 5. Needless to say that this is not a limitation, and including the type of the spring, this can be changed as appropriate.

Embodiment 3

Figure 5:
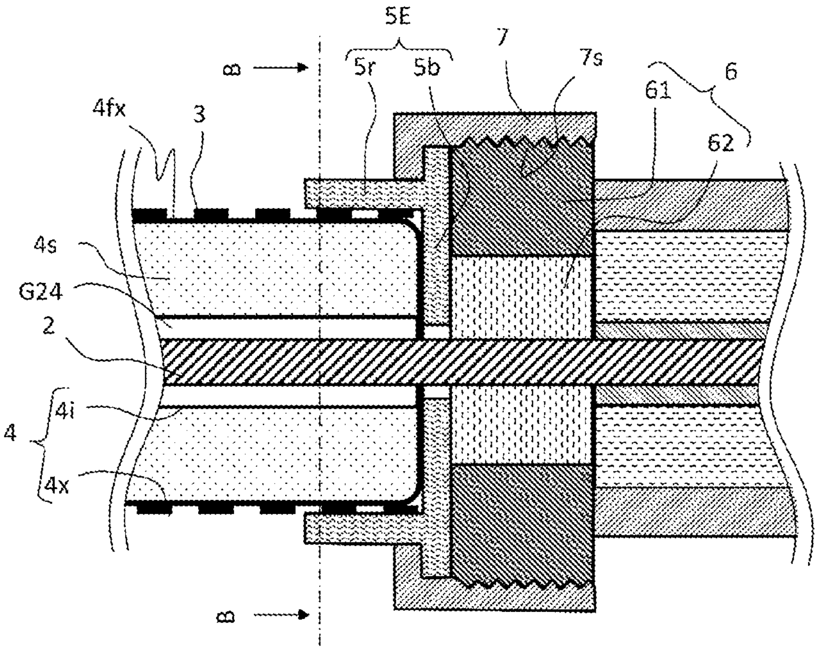
FIG. 5 is a partially enlarged cross-sectional view along an axis of a microwave-excited light source device according to Embodiment 3.
Figure 6:
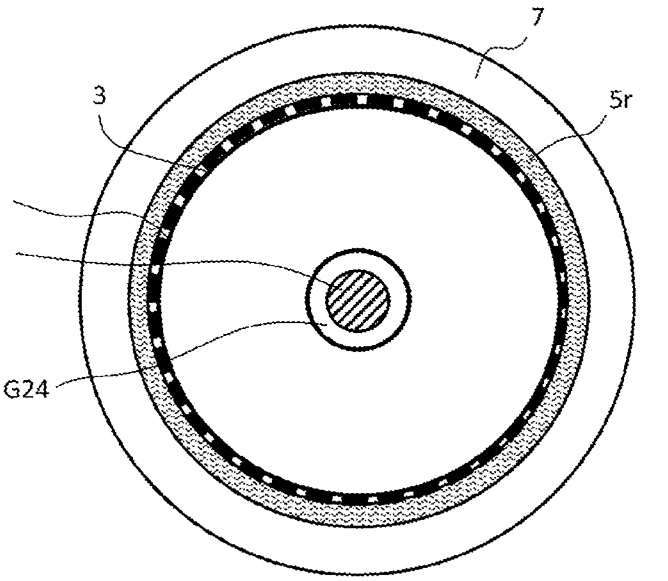
FIG. 6 is a cross-sectional view perpendicular to the axis of the microwave-excited light source device according to Embodiment 3.

In Embodiment 1 and Embodiment 2 described above, examples have been described in which a clearance is provided between the connector and the connection end plate, and the connector and the connection end plate are coupled by an elastically deformable coupling member. In Embodiment 3, a configuration example will be described in which a connector formed of a conductive rubber is used to couple the connector and a connection end plate in a close contact state. FIG. 5 and FIG. 6 are diagrams for describing a configuration of a microwave-excited light source device according to Embodiment 3, FIG. 5 is a partially enlarged cross-sectional view along the axis of the microwave-excited light source device corresponding to FIG. 2 of Embodiment 1, and FIG. 6 is a cross-sectional view perpendicular to the axis, corresponding to a line B-B of FIG. 5. Note that as in Embodiment 2, for each of the entire images in the arc tube, the annular electrode, and the center electrode, FIG. 1 in Embodiment 1 is referred to.

In the microwave-excited light source device 1 according to Embodiment 3, as shown in FIG. 5 and FIG. 6, the connection end plate 6 and the annular electrode 3 are connected to each other via a connector 5E formed of a conductive rubber. The connector 5E is integrally molded using a conductive rubber (elastic body) so as to have an annular portion 5*r* whose inside diameter matches the outer diameter D4 of the arc tube 4, and a disc portion 5*b* that has a larger diameter than the annular portion and is provided at one end (right side in the figure) of the annular portion 5*r*, with a through hole for passing the center electrode 2 in the center.

An inner diameter and a thickness of the annular portion 5*r* in the radial direction are large enough to provide a clamping force (pressing force) that is required to maintain stable electrical connection between the annular portion 5*r* and the annular electrode 3 when the annular portion 5*r* is fitted into the arc tube 4. Further, the thickness in the radial direction is set so that a resistance value in the axial direction as the electrical connection path should not be excessive.

As in the coupling member 7 of Embodiment 1, the thickness of the disc portion 5*b* in the axal direction is determined on the basis of the property of the conductive rubber as an elastic body so as to secure the amount of deformation necessary for achieving the buffering function when a mechanical shock is applied to the arc tube 4.

The connection end plate 6 basically has the same structure as that of Embodiment 2, and is constituted with the conductor portion 61 for electrical connection to the annular electrode 3 and the insulator portion 62 having a through hole formed in the center thereof for passing the center electrode 2 therethrough, and a male thread is formed on the outer circumferential surface of the conductor portion 61.

The coupling member 7 is formed in a cylindrical shape, the female thread 7*s* for screwing the connection end plate 6 is provided on one end side in the axial direction, and an inner edge portion for allowing the annular portion 5*r* to pass and receiving an outer edge portion of the disc portion 5*b* is formed on the other end side. Then, the annular portion 5*r* is to cover the arc tube 4 together with the annular electrode 3 such that the annular portion 5*r* protrudes from the inner edge portion of the coupling member 7 with the connector 5E fitted into the coupling member 7. Since the inner diameter of the annular portion 5*r* is smaller than the diameter of the arc tube 4, the arc tube 4 is compressed by the annular portion 5*r* due to the elasticity as the conductive rubber, and the mechanical support between the arc tube 4 and the connector 5E is established.

In this state, the connection end plate 6 is screwed into the female thread 7*s* until the connection end plate 6 abuts against the disc portion 5*b*, whereby the connection end plate 6 and the connector 5E being an elastic body, and the connector 5E and the end surface of the arc tube 4 are brought into close contact with each other. That is, the relation is established such that the connection end plate 6, the connector 5E, and the arc tube 4 are mechanically supported by each other via the coupling member 7.

Then, since the connector 5E is formed of a conductive material, a stable electrical connection path from the connection end plate 6 (the conductor portion 61 thereof) to the annular electrode 3 via the connector 5E is completed with the mechanical fixation of the coupling member 7 and the connection end plate 6 by the screwing into the female screw 7*s*. Note that, in Embodiment 3, since the connector 5E is in direct contact with the conductor portion 61, the coupling member 7 does not need to be formed of a conductive member, and may be configured to have only a function of mechanically supporting the connector 5E and the connection end plate 6.

As in Embodiment 1 and Embodiment 2, the center electrode 2 is mechanically fixed to and supported by the insulator portion 62 of the connection end plate 6, and is electrically connected to the other pole of the microwave generation source 100 directly or via a coaxial cable or the like. With respect to the relationship with the inner circumferential surface 4*fi* of the inner tube 4*i* of the arc tube 4, mechanical connection of the center electrode 2 is cut with respect to the arc tube 4, and the center electrode 2 is allowed to move in the axial direction of the arc tube 4 or in a direction inclined with respect to the axis.

On the premise of the configuration described above, it is assumed that a force is applied to the arc tube 4 in a direction in which the axis is to be inclined. Then, while the forces are applied, the connector 5E is deformed, so that the connector 5E itself changes in shape similarly to the clearance G7*r* and the clearance G7*a* described in Embodiment 2. At this time, the arc tube 4 is displaced with respect to the connection end plate 6 (and the coupling member 7) without accompanying displacement between the connector 5E and the annular electrode 3, and the stress to be applied to the contact surface between the annular electrode 3 and the connector 5E is suppressed, so that change in the state can be prevented. As a result, no displacement occurs between the annular electrode 3 in close contact with the outer circumferential surface 4*fx* and the connector 5E, and the electrical connection state, i.e., the impedance, can be maintained at the initially set value and desired light emission characteristics can be maintained.

On the other hand, although the center electrode 2 is mechanically fixed to the connection end plate 6, the center electrode 2 does not hit against the inner circumferential surface 4*fi* of the arc tube 4 when the center electrode 2 is displaced, because there is the clearance G24 between the center electrode 2 and the inner circumferential surface 4*fi*. Further, since the displacement is caused by the deformation of the connector 5E formed of the conductive rubber, i.e., the displacement caused by the elastic deformation, when the external force is removed, the connector 5E returns to the original position, i.e., the regular position along the axis in the center. In other words, the displacement due to the mechanical shock is reversible, and when the external force is removed, the annular space between the center electrode 2 and the annular electrode 3 also returns to its original state, so that the state of the electromagnetic field is recovered and the characteristics can be maintained.

Embodiment 4

In the above-described Embodiment 1 to Embodiment 3, examples have been described in which the buffer mechanism that relaxes the stress due to a mechanical shock is formed between the connection end plate constituting the support mechanism, which supports the arc tube, and the annular electrode, with respect to the connection end plate to be electrically connected to the microwave generation source 100. On the other hand, in Embodiment 4, unlike Embodiment 1 to Embodiment 3, it is assumed that the microwave generation source 100 is not fixed to an installation target such as equipment that performs an irradiation process, and is in a mechanically floating state. In addition, an example will be described in which a support mechanism for supporting the connection end plate with respect to the installation target is provided, a second coupling member of an elastic body is interposed between the support mechanism and the connection end plate to form a buffer mechanism.

Figure 7:
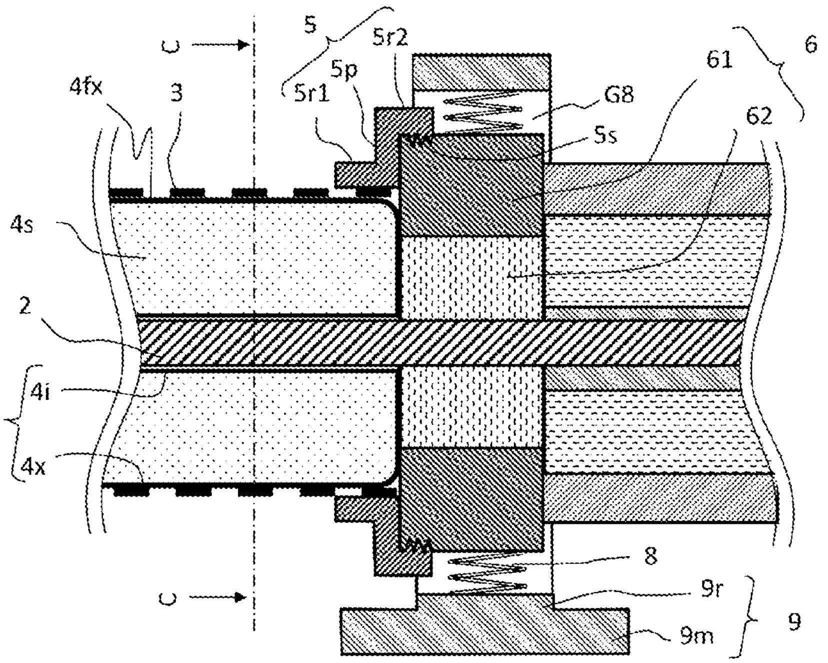
FIG. 7 is a partially enlarged cross-sectional view along an axis of a microwave-excited light source device according to Embodiment 4.
Figure 8:
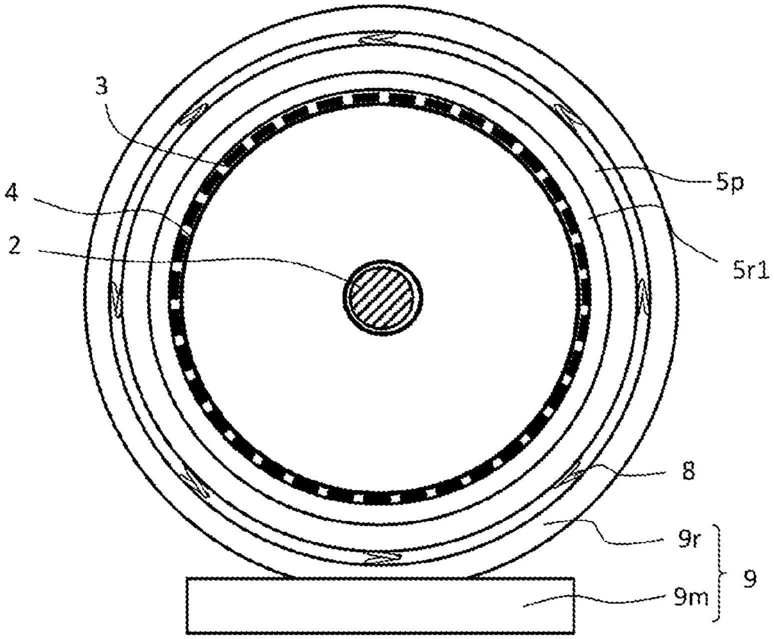
FIG. 8 is a cross-sectional view perpendicular to the axis of the microwave-excited light source device according to Embodiment 4.

FIG. 7 and FIG. 8 are for describing a configuration of a microwave-excited light source device according to Embodiment 4, FIG. 7 is a partially enlarged cross-sectional view along the axis of the microwave-excited light source device corresponding to FIG. 2 of Embodiment 1, and FIG. 8 is a cross-sectional view perpendicular to the axis, corresponding to a line C-C of FIG. 7. Note that as in Embodiment 2 and Embodiment 3, for each of the entire images in the arc tube, the annular electrode, and the center electrode, FIG. 1 in Embodiment 1 is referred to.

In the microwave-excited light source device 1 according to Embodiment 4, as shown in FIG. 7 and FIG. 8, the arc tube 4 and the connection end plate 6 are mechanically and fixedly supported by a connector 5 that electrically connects the annular electrode 3 and the conductor portion 61. The connection end plate 6 is configured to be supported by a supporting member 9 for fixing and supporting the device main body through a second connecting member 8 constituted with an elastic body.

The connector 5 has a structure like a different diameter joint in which a first annular portion 5*rl* for covering the outer circumferential surface 4*fx* of the arc tube 4, a second annular portion 5*r*2 having a thread 5*s* cut in the inner circumferential surface for screwing the connection end plate 6, and an edge portion 5*p* are integrated. Therefore, as shown in FIG. 7, the connection end plate 6 and the connector 5 are to be connected. The arc tube 4 is mechanically fixed by covering the first annular portion 5*rl* in the same manner as described in Embodiment 1 to be electrically connected to the annular electrode 3.

Further, the connector 5 is mechanically fixed to the connection end plate 6 and electrically connected to the conductor 61 by screwing the connection end plate 6 until it abuts against the edge portion 5*p*, similar to the relationship between the coupling member 7 and the connection end plate 6 in Embodiment 2. At this time, the connection end plate 6 and the arc tube 4 are brought into close contact with each other in the axial direction, so that the arc tube 4, the connector 5, and the connection end plate 6 are mechanically and firmly fixed in both the axial direction and the radial direction. However, in an outer circumferential surface of the connection end plate 6, the thread 5*s* is not cut in a region to be connected to the second connection member 8, and the thread extends from a side close to the arc tube 4 to a range not reaching the center in the axial direction.

That is, in Embodiment 4, the connector 5 does not have a buffering function depending on the elastic deformation, but functions as a coupling member for mechanically fixing the arc tube 4 and the connection end plate 6, and also functions as an electrical connection path between the annular electrode 3 and the conductor portion 61. In addition, in Embodiment 4, unlike Embodiment 1 to Embodiment 3, no clearance is provided between the center electrode 2 and the inner circumferential surface 4*fi* of the arc tube 4, and the center electrode 2 and the arc tube 4 are also mechanically fixed to each other. That is, the center electrode 2, the arc tube 4, the annular electrode 3, the connector 5, and the connection end plate 6 are mechanically fixed and integrated.

On the other hand, the microwave generation source 100 is not fixed to the equipment and is in a mechanically floating state, and when a mechanical shock is applied to the arc tube 4, the microwave generation source 100 is also displaced together with the connection end plate 6. Therefore, in order to fix the main body of the microwave-excited light source device 1 to the equipment, the microwave-excited light source device 1 includes the supporting member 9 having a fixing base 9*m* for fixing to the equipment, an annular portion 9*r* surrounding the outer circumferential surface of the connection end plate 6 with a clearance G8 therebetween, and a second coupling member 8 for coupling the supporting member 9 and the connection end plate 6.

In the second coupling member 8, for example, a plurality of helical springs whose axes are oriented in the radial direction are arranged in a distributed manner in the circumferential direction (at eight positions at intervals of 45 degrees in the figure), and each of the helical springs presses a portion of the outer circumferential surface of the connection end plate 6 exposed from the connector 5 (second annular portion 5*r*2). Thus, the supporting member 9 is configured to mechanically support the connection end plate 6, that is, the main body of the microwave-excited light source device 1 via the elastic body.

On the premise of the configuration described above, it is assumed that a force is applied to the arc tube 4 in a direction in which the axis is to be inclined. Then, while the force is applied, the helical spring (elastic body) constituting the second coupling member 8 is deformed, so that the displacement between the connector 5 and the annular electrode 3 and the displacement between the connector 5 and the connection end plate 6 are not accompanied. Therefore, even if a mechanical shock is applied, the stresses to be applied to the contact surface between the annular electrode 3 and the connector 5 and to the contact surface between the connector 5 and the connection end plate 6 (the conductor portion 61) are suppressed, and the state change can be prevented. As a result, there is no portion where displacement occurs between the annular electrode 3 in close contact with the outer circumferential surface 4*fx* and the conductor portion 61, and the electrical connection state, i.e., the impedance, can be maintained at the initially set value and desired light emission characteristics can be maintained.

Note that, in Embodiment 4, it is assumed that the microwave generation source 100 is directly fixed to the connection end plate 6 and is mechanically integrated with the arc tube 4, but this is not a limitation. For example, even when the microwave generation source 100 is electrically connected to the conductor portion 61 of the connection end plate 6 and the center electrode 2 via a flexible coaxial cable, the support mechanism having a mechanical buffering function by the supporting member 9 and the second coupling member 8 functions effectively.

Alternatively, even when the annular portion 9*r* of the supporting member 9 and the second coupling member 8 may be formed of a conductor to form an electrical connection path to the annular electrode 3 via the supporting member 9, the support mechanism having the mechanical buffering function by the supporting member 9 and the second coupling member 8 functions effectively.

Although various exemplary embodiments and examples are described in the present application, various features, aspects, and functions described in one or more embodiments are not inherent in an application of the contents disclosed in a particular embodiment, and can be applicable alone or in their various combinations to each embodiment. Accordingly, countless variations that are not illustrated are envisaged within the scope of the art disclosed herein. For example, the case where at least one component is modified, added or omitted, and the case where at least one component is extracted and combined with a component disclosed in another embodiment are included.

For example, an example in which the annular electrode 3 is formed of the mesh conductor has been described, but this is not a limitation, and indium-tin oxide (ITO) referred to as a transparent electrode may be used. In addition, although mercury is used as the luminescent material on the premise of sterilization, this is not a limitation, and in a use in which uniform emission (irradiation to a processing target) in the axial direction is desired, sulfur(S), argon (Ar), xenon (Xe), or the like may be used as the luminescent material and the frequency of the microwave may be determined as appropriate in accordance with the material. Further, although the arc tube 4 is made of quartz glass having a high ultraviolet transmittance, it is needless to say that the material of the arc tube 4 may be selected as appropriate in accordance with light to be emitted.

As described above, according to the microwave-excited light source device 1 of the present application, the microwave-excited light source device 1 that is electrically connected to the microwave generation source 100 and generates microwave-excited light includes the center electrode 2 electrically connected to one pole of the microwave generation source 100 and extending in an axial direction, the annular electrode 3 concentrically disposed with respect to the center electrode 2, the arc tube 4 that is disposed in an annular space formed between the center electrode 2 and the annular electrode 3 and emits the microwave-excited light, the connection end plate 6 to which the other pole of the microwave generation source 100 is electrically connected, the connector 5 that electrically connects the annular electrode 3 and the connection end plate 6, and the buffer mechanism (for example, coupling member 7, connector 5E, second coupling member 8) that is elastically deformed when the arc tube 4 is subjected to an external force and suppresses stress applied to a contact surface between the annular electrode 3 and the connector 5. Therefore, even if the arc tube 4 is subjected to an external force such as a mechanical shock, the stress to be applied to the electrical connection portion is relaxed, so that the electrical connection state can be appropriately maintained, and the microwave-excited light source device 1 capable of performing desired irradiation while suppressing a change in the light emission characteristics can be obtained.

At this time, the microwave-excited light source device is configured such that the connector 5 has an annular shape, one end side thereof (annular portion 5*r*) in the axial direction fitted to the outer circumferential surface 4*fx* of the arc tube 4 interposes the annular electrode 3 between the one end side and the outer circumferential surface 4*fx*, and the clearance G7*a* in the axial direction is provided between the other end side thereof (edge portion 5*p*) and the connection end plate 6. The microwave-excited light source device includes the coupling member 7 formed of an elastic body that expands and contracts in an axial direction, is disposed in the clearance G7*a* in the axial direction to couple the connector 5 and the conductor portion 61 and functions as the buffer mechanism. As a result, even if the arc tube 4 is subjected to an external force in any direction, the coupling member 7 is deformed to relax the stress in the contact surface between the connector 5 and the annular electrode 3, so that the electrical connection state can be appropriately maintained, and the microwave-excited light source device 1 capable of performing desired irradiation while suppressing a change in the light emission characteristics can be obtained.

Alternatively, the microwave-excited light source device is configured such that the connector 5 is constituted with a plurality of arc-shaped plates that are divided and arranged in a circumferential direction, and the coupling member 7 functioning as the buffer mechanism is constituted with the cylindrical portion 72 that has the inner circumferential surface 7*fi* at one end side in an axial direction facing the outer circumferential surface 4*fx* of the arc tube 4 with the clearance G7*r* therebetween in a radial direction and has the other end side thereof fixed to the connection end plate 6 (conductor portion 61), and the elastic body (elastic member 71) that expands and contracts in the radial direction to press the connector 5 toward the arc tube 4. Thus, the stress in the contact surface between the connector 5 and the annular electrode 3 is relaxed owing to the deformation of the elastic member 71 so that the electrical connection state can be appropriately maintained, and the microwave-excited light source device 1 capable of performing desired irradiation while suppressing a change in the light emission characteristics can be obtained.

In this case, when the arc tube 4 and the connection end plate 6 are disposed with the clearance G7*a* therebetween in the axial direction, even if the arc tube 4 is subjected to an external force in any direction, the stress in the contact surface between the connector 5 and the annular electrode 3 can be relaxed.

The microwave-excited light source device is configured such that the connector 5E is formed of a conductive rubber and has the annular shape, one end side thereof (annular portion 5*r*) fitted to the outer circumferential surface 4*fx* of the arc tube 4 interposes the annular electrode 3 between the one end side and the outer circumferential surface 4*fx*, and the other end side thereof (disc portion 5*b*) has the disc shape and is interposed between the arc tube 4 and the connection end plate 6 in the axial direction, thereby functioning as the buffer mechanism. Thus, the stress in the contact surface between the connector 5E and the annular electrode 3 is relaxed owing particular to the deformation of the disc portion 5*b* of the connector 5E, so that the electrical connection state can be appropriately maintained, and the microwave-excited light source device 1 capable of performing desired irradiation while suppressing a change in the light emission characteristics can be obtained.

In the case described above, if the clearance G24 in the radial direction is provided between the inner circumferential surface 4*fi* of the arc tube 4 and the center electrode 2, the center electrode 2 does not hit against the inner circumferential surface 4*fi* of the arc tube 4 when the buffer mechanism is deformed, so that the microwave-excited light source device 1 with higher reliability can be obtained.

Furthermore, the microwave-excited light source device is configured such that the supporting member 9 fixed to an installation target such as a sterilization treatment tank is provided and the second coupling member 8 couples the supporting member 9 and the connection end plate 6, is elastically deformed when the arc tube 4 is subjected to an external force, suppresses stress to be applied to the contact surface between the annular electrode 3 and the connector 5, and functions as the buffer mechanism. Thus, even if the installation target is subjected to an external force that cause the arc tube 4 to displace, the stress applied to the electrical connection portion is relaxed, so that the electrical connection state can be appropriately maintained, and the microwave-excited light source device 1 capable of performing desired irradiation while suppressing a change in the light emission characteristics can be obtained.

DESCRIPTION OF REFERENCE NUMERALS AND SIGNS

1: microwave-excited light source device, 100: microwave generation source, 2: center electrode, 3: annular electrode, 4: arc tube, 4*s*: light-emitting space, 4*fi*: inner circumferential surface, 4*fx*: outer circumferential surface, 5: connector, 5E: connector (buffer mechanism), 6: connection end plate, 61: conductor portion, 62: insulator portion, 7: coupling member (buffer mechanism), 8: second coupling member (buffer mechanism), 9: supporting member, D2: outer diameter (of center electrode), D4*i*: inner diameter (of inner tube of arc tube), G24: clearance, G7*a*: clearance (in axial direction), G7*r*: clearance (in radial direction), G8: clearance.

The invention claimed is:

1. A microwave-excited light source device that is electrically connected to a microwave generation source and generates microwave-excited light, the microwave-excited light source device comprising:

a center electrode electrically connected to one pole of the microwave generation source and extending in an axial direction;

an annular electrode concentrically disposed with respect to the center electrode;

an arc tube that is disposed in an annular space formed between the center electrode and the annular electrode and emits the microwave-excited light;

a connection end plate to which the other pole of the microwave generation source is electrically connected;

a connector that has an annular shape, whose one end side in the axial direction fitted to an outer circumferential surface of the arc tube interposes the annular electrode between the one end side and the outer circumferential surface, is provided with a clearance in the axial direction between the other end side and the connection end plate, and electrically connects the annular electrode and the connection end plate; and a coupling member formed of an elastic body that expands and contracts in the axial direction, is disposed in the clearance in the axial direction to couple the connector and the connection end plate, is elastically deformed when the arc tube is subjected to an external force, and functions as a buffer to suppresses stress to be applied to a contact surface between the annular electrode and the connector.

2. The microwave-excited light source device according to claim 1, wherein a clearance in a radial direction is provided between an inner circumferential surface of the arc tube and the center electrode.

3. A microwave-excited light source device that is electrically connected to a microwave generation source and generates microwave-excited light, the microwave-excited light source device comprising:

a center electrode electrically connected to one pole of the microwave generation source and extending in an axial direction;

an annular electrode concentrically disposed with respect to the center electrode;

an arc tube that is disposed in an annular space formed between the center electrode and the annular electrode and emits the microwave-excited light;

a connection end plate to which the other pole of the microwave generation source is electrically connected; and a connector that is formed of a conductive rubber, whose one end side in the axial direction has an annular shape and is fitted to an outer circumferential surface of the arc tube to interpose the annular electrode between the one end side and the outer circumferential surface, and whose other end side has a disc shape and is interposed between the arc tube and the connection end plate in the axial direction to electrically connect the annular electrode to the connection end plate, wherein the connector has a thickness in a portion having the disc shape to be set such that the connector is elastically deformed when the arc tube is subjected to an external force and can secure an amount of deformation for functioning as a buffer to suppress stress applied to a contact surface between the annular electrode and the connector.

4. The microwave-excited light source device according to claim 3, wherein a clearance in a radial direction is provided between an inner circumferential surface of the arc tube and the center electrode.

* * * * *